Oct. 10, 1939.    T. R. SCOTT ET AL    2,175,672
PREPARATION OF SEALS BETWEEN CERAMIC MATERIAL AND METAL
Filed Jan. 7, 1939
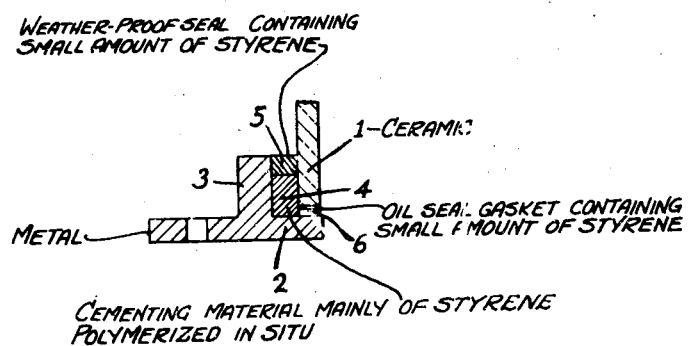
Inventors
T.R.Scott
L.A.C.Pooley
by
Attorney Patented Oct. 10, 1939

2,175,672

UNITED STATES PATENT OFFICE 2,175,672

PREPARATION OF SEALS BETWEEN CERAMIC MATERIAL AND METAL

Thomas Robertson Scott and Leonard Arthur Charles Pooley, London, England, assignors to International Standard Electric Corporation, New York, N. Y.

Application January 7, 1939, Serial No. 249,826 In Great Britain January 4, 1938

9 Claims. (Cl. 174—31)

This invention relates to electrical fittings such as sealing bells, potheads and the like which generally speaking comprise a porcelain or like ceramic body fitted with a metal collar at each end for mounting purposes and/or for the connection of external electric circuits thereto. In connection with such electrical fittings a difficulty arises due to the different thermal coefficient of expansion of the ceramic body and the metal, and the invention is more particularly concerned with the provision of sealing means between the ceramic part and the metal part of such electrical fittings.

It is customary to attach the metal parts of the fittings to the porcelain body by means of Portland cement, red lead or combinations thereof which may be admixed with varnishes such as shellac to reduce the porosity of the material to oil or to clamp the porcelain body into the metal with intervening gaskets but both of these methods are apt to give trouble due to the escape of insulating compound such as oil, with which these electrical fittings are usually filled which may lead to electrical breakdown. Trouble may in a similar manner be caused by the ingress of moisture or moisture laden air.

An object of the invention is to overcome this difficulty and with this object in view we provide, according to the invention, a method of sealing the metallic part of an electrical fitting of the kind referred to (e. g. a pot-head) to the ceramic part thereof comprising providing a filling of cementing material consisting of styrene or an insulating composition containing styrene between the metal and ceramic parts and then obtaining the cementing effect between the parts by polymerisation of the cementing material in situ which expression includes advancing the polymerisation of partially polymerised material. By means of the polymerisation in situ the cementing material as it hardens bonds or welds to the walls of the electrical fitting and thus affords an effective seal.

The cementing material may comprise styrene plasticised according to U. S. patent application Ser. No. 190,032, filed February 11, 1938, which teaches the method of plasticizing polymerized styrene by adding thereto an amount not over 25% of a chemically stable homocyclic carbon compound having not less than two and not more than three fused rings, said compound having a boiling point higher than 240° C., and a symmetrical arrangement of polar groups, or styrene blended with rubber or the like to which rubber plasticizers such as ceresin wax may be added.

Alternatively, the cementing material may comprise styrene admixed with an aliphatic olefine such as polyethylene or polyisobutylene to which ingredients such as rubber or materials according to our application Ser. No. 190,032 may be added. The above cementing materials afford considerable resiliency at ordinary atmospheric conditions and especially if the polymerisation of the cementing material is controlled to give a product having a required degree of tenacity and resiliency. In this connection it may be mentioned that it is known that the mechanical characteristics of polymerised styrene can be varied within wide limits, for example, by the selection of the temperatures of polymerisation of the material.

The cementing material is preferably applied in a partially polymerised condition. This may be effected by stopping the polymerisation process of the material at any desired point or by completing the polymerisation process and adding monomeric styrene to the material prior to application thereof to the metal/porcelain joint or subsequently in situ prior to the polymerisation process. The material is preferably bounded at the surface adjacent to the insulating compound, e. g. oil in the interior of the electrical fitting by an oil resisting gasket seal. This gasket may be constructed from a styrene/rubber blend so that during the polymerisation process the gasket is welded into the cementing material by the solvent action of the partially polymerised styrene on the styrene blend mentioned above. The main cementing material is also preferably bounded on the surface adjacent to the external atmosphere by seal which again should contain styrene to permit of it being welded into the cementing material as described above. This external seal should be of a material chosen for its weather resisting characteristics. It may for example, consist of styrene/rubber which has been vulcanised. It should, however, be resilient.

During the polymerisation process the cementing material should be maintained under external pressure so that polymerisation shrinkage, and also shrinkage during cooling down from the polymerisation temperature is taken up by compression of the cementing material. The compression of the gasket will also seal off the cementing material from the atmosphere and prevent loss of monomeric material by volatilisation during the polymerisation process. Preferably the cementing material is disposed between the wall of the ceramic part and an upstanding flange on the metal part of the fitting.

The cementing material may comprise monomeric or partially polymerised styrene loaded with paper, acetylated paper or other fibrous material such as jute. A layer of Portland cement or like normal cement material may be superimposed at the surface exposed to the atmosphere in repairing end bells or the like.

In order that the invention may be clearly understood and readily carried into effect reference is directed to the accompanying drawing which shows diagrammatically and by way of example a detail view of an electrical fitting embodying the invention.

Referring to the drawing, 1 represents the ceramic e. g. porcelain part of the electrical fitting, 2 represents the metal part of the fitting which is provided with an upstanding flange 3 to retain the cementing material indicated at 4. A compound resisting gasket 6 is shown on the inner surface of the cementing material 4 and a weather resisting gasket on the outside is indicated at 5.

What is claimed is:

1. A method of sealing the metallic part of an electrical fitting to a ceramic part thereof which comprises, providing a filling of a cementing material mainly of styrene between the metal and ceramic parts of the fitting, providing a gasket containing a small amount only of styrene at an exposed surface of the cementing material and then hardening the cementing material and the gasket by polymerization of the styrene in situ to bond to the walls of said electrical fitting parts and to said gasket.

2. A method according to claim 1 wherein said cementing material comprises styrene which has been plasticized by adding thereto an amount not over 25% of a homocyclic carbon compound having not less than two and not more than three fused rings, said compound having a boiling point higher than 240° C. and a symmetrical arrangement of polar groups.

3. A method according to claim 1 wherein said cementing material comprises styrene blended with rubber.

4. A method according to claim 1 wherein said cementing material comprises styrene and an aliphatic olefine such as polyethylene, or polyisobutylene.

5. A method according to claim 1 further comprising, controlling the temperature of the cementing material during polymerisation to produce a product having the required degree of tenacity and resiliency.

6. A method according to claim 1 wherein said cementing material comprises styrene that has been polymerised before application to the fitting, plasticized by addition of a controlled amount of monomeric styrene.

7. A method according to claim 1 wherein said gasket comprises a rubber and styrene mixture.

8. A method according to claim 1, further comprising providing a weatherproof seal containing a small amount only of styrene, and bonding said cementing material to said seal by said polymerisation in situ.

9. An electrical fitting which is adapted to contain an insulating compound comprising, a metallic part, a ceramic part, a compound resisting gasket containing a small amount only of styrene fitted between said parts internally of said fitting, cementing material comprising principally polymerised styrene bonded to said parts and to said gasket, and a weather resisting seal containing a small amount only of styrene and bonded to the cementing material and the fitting parts externally of said fitting.

THOMAS ROBERTSON SCOTT.
LEONARD ARTHUR CHARLES POOLEY.